United States Patent
Saam et al.

[15] 3,678,125
[45] July 18, 1972

[54] SILOXANE CONTAINING THERMOPLASTIC

[72] Inventors: John C. Saam; Frederick W. G. Fearon, both of Midland, Mich.

[73] Assignee: Dow Corning Corporation, Midland, Mich.

[22] Filed: Aug. 25, 1970

[21] Appl. No.: 66,892

[52] U.S. Cl. .................. 260/827, 117/161 ZA, 260/23 S, 260/33.6 SB, 260/93.5 R
[51] Int. Cl. .................................. C08g 47/10, C08f 33/08
[58] Field of Search .................................................. 260/827

[56] References Cited

UNITED STATES PATENTS

| | | | |
|---|---|---|---|
| 3,483,270 | 12/1969 | Bostick | 260/827 |
| 3,051,684 | 8/1962 | Morton et al. | 260/827 |
| 3,187,031 | 6/1965 | Weyenberg | 260/827 |
| 3,187,032 | 6/1965 | Weyenberg | 260/827 |
| 3,576,904 | 4/1971 | Saam et al. | 260/827 |

FOREIGN PATENTS OR APPLICATIONS 1,915,789  10/1969  Germany ........................ 260/827

*Primary Examiner*—Samuel H. Blech
*Attorney*—Robert F. Fleming, Jr., Laurence R. Hobey, Harry D. Dingman, Howard W. Hermann and Roger H. Borrousch

[57] ABSTRACT

Block copolymers of polydiorganosiloxane blocks and polystyrene blocks are thermoplastics useful as coating materials and film formers with excellent weathering.

6 Claims, No Drawings

SILOXANE CONTAINING THERMOPLASTIC

This invention relates to block copolymers which are thermoplastics.

Block copolymers of various kinds are known in the polymer art. Each of the block copolymers described in the art are said to have some special advantage or property. It is an object of this invention to provide a block copolymer which is a thermoplastic. This object and others will become apparent from the following detailed description of the present invention.

This invention relates to a thermoplastic consisting essentially of a block copolymer of the formula

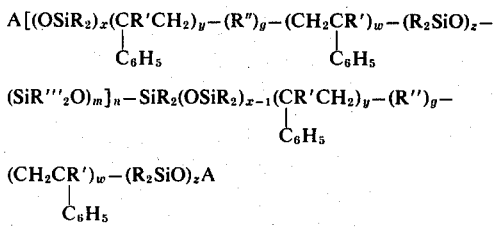

in which each R is a monovalent radical selected from the group consisting of methyl, ethyl, phenyl and vinyl, each R' is selected from the group consisting of a hydrogen atom and a methyl radical, R" is a divalent hydrocarbon radical having from two to 30 inclusive carbon atoms, each R'" is a monovalent radical selected from the group consisting of methyl, ethyl, propyl, butyl, phenyl and 3,3,3-trifluoropropyl, each A is a monovalent radical selected from the group consisting of a hydrogen atom and $R_3Si-$ radicals, $m$ is an integer of from 0 to 1 inclusive, $w$ and $y$ have a value such that the molecular weight of

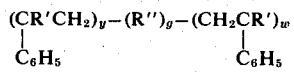

is greater than 7000, $x$ and $z$ have a value such that the block copolymer has 40 to 60 inclusive weight percent $R_2SiO$, $g$ is an integer of from 0 to 1 inclusive, and $n$ has a value greater than 1, there being present less than 5 weight percent free polydiorganosiloxane and there being present less than 10 weight percent free polystyrene.

The flock copolymers of the present invention can be prepared by polymerizing styrene or alpha-methyl styrene or mixtures thereof in an organic solvent solution with a dilithium organic compound of the formula $(R'')Li_2$ where R" is a divalent hydrocarbon radical having from two to 30 inclusive carbon atoms such as illustrated in the following compounds such as dilithiostilbene, 1,4-dilithiobenzene, 1,5-dilithiopentane, 1,5-dilithionaphthalene and 1,2-dilithio-1,3,3-triphenylpropane. The amount of dilithium organic compound used per amount of vinyl containing organic monomer will determine the size of the organic block. The smaller the amount of dilithium organic compound per given amount of styrene or alpha-methylstyrene, the greater the number of polymerized styrene or alpha-methylstyrene units in the resulting polymer. The amount of the dilithium organic compound used can be readily approximated by taking the value obtained by dividing the weight of the styrene or alpha methylstryene to be used by the molecular weight of the polystyrene or poly-alpha-methylstyrene block desired. The results provide the number of moles of dilithium organic compound which is to be used. Since the reaction goes to almost 100 percent conversion and if the undesirable impurities have been carefully removed, the number average molecular weight obtained will be very close to the desired molecular weight used in determining the number of moles of dilithium organic compound to be used. It is to be understood that under certain conditions the results can deviate somewhat from those calculated, since the percent conversion can vary.

The reaction between the dilithium organic compound and the styrene and alpha-methylstyrene should be carried out under conditions free from contaminations such as water, air, oxygen, inhibitors, acidic impurities, greases and the like. The mixture of styrene or alpha-methylstyrene and the dilithium organic compound in solvent solution are maintained at a temperature between the reflux temperature of the mixture and the freezing point of the mixture until the styrene or alpha-methylstyrene has polymerized. When alpha-methylstyrene is the major monomer to be used, it is desirable to carry out the polymerization below −40° C. and thereafter to add small amounts of styrene and continue the polymerization to provide small polystyrene segments on the poly-alpha-methylstyrene. Since the hexaorganocyclotrisiloxane does not readily polymerize with the lithium ended polymers below −40° C. and since the lithium ended poly-alpha-methylstyrene tends to depolymerize above −40° C., the small segments of polystyrene on the poly-alpha-methylstyrene allow the reaction mixture to be warmed above −40° C. without depolymerization. Further details describing this method can be found in our copending application filed concurrently herewith Ser. No. 66,891, filed Aug. 25, 1970, and entitled "A Method of Preparing a Block Copolymer Containing a Poly-Alpha-Methylstryene Block and a Polydiorganosiloxane Block and Block Copolymers Prepared Thereby."

The reaction product from the reaction of the dilithium organic compound and styrene, for example, is a lithium terminated polymer of the following formula

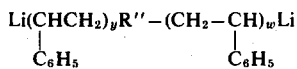

wherein $y$ and $w$ are the number of styrene units in the polymer and R" is the residue from the dilithium organic compound. In these cases $g$ is 1. When the electron transfer polymerization method is used to polymerize the styrene or alpha-methylstyrene, $g$ is 0, since no residue results in the polymeric product. The electron transfer polymerization method is well known in the art as described in U.S. Pat. Nos. 2,985,594, 3,134,745 and 3,458,491 which are hereby incorporated by reference to describe the process.

To the lithium terminated polymer solution, hexaorganocyclotrisiloxane in solvent solution is added in an amount sufficient to provide at least one hexaorganocyclotrisiloxane molecule per each lithium end. The addition should be carried out so that there is no exposure to previously stated impurities. The resulting product would be, for the most part, a polymer of the formula wherein styrene is used for illustrative purposes.

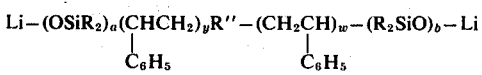

where R, R", $y$ and $w$ are defined above and $a$ and $b$ are each from 1 to 3 inclusive. The reaction is held at a temperature between −50° C. and no greater than the reflux temperature of the mixture. After sufficient time has elapsed, which is at least 30 minutes to 4 hours and which is recognizable by the disappearance of the color characteristic for lithium ended organic polymers, additional hexaorganocyclotrisiloxane in solvent solution and a polymerization promoter preferably in an amount of at least one weigh percent based on the weight of the mixture is added to the lithium ended silicon-containing copolymer. Hexaorganocyclotrisiloxane is added in an amount necessary to provide the desired siloxane block size such that the block copolymer contains from 40 to 60 weight percent $R_2SiO$ units. The reaction mixture is preferably heated to reflux for 3 to 4 hours to increase the reaction rate. The reaction, however, can be carried out between −50° C. and the reflux temperature of the mixture for at least 30 minutes or greater. The resulting product has a formula

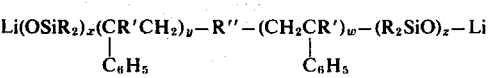

where R, R', R", $y$ and $w$ are defined above and $x$ and $z$ have values such that the block copolymer has from 40 to 60 weight percent $R_2SiO$ units. The lithium ended block copolymer can be condensed directly, terminated with silanols by reaction with a protonic material such as acetic acid and then condensed or by reaction with $R'''_2SiCl_2$. This lithium ended block copolymer is then reacted with sufficient $R'''_2SiCl_2$ to couple the molecules of block copolymer together and increase the molecular weight sufficiently to provide a block copolymer of the formula

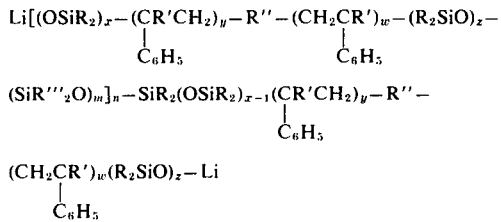

where R, R', R'', y, w, x and z are defined above, n has a value greater than 1, m is 0 or 1, and each R''' is a monovalent radical of methyl, ethyl, propyl, butyl, phenyl or 3,3,3-trifluoropropyl. The lithium atoms in this polymer can be replaced by hydrogen atoms by washing the polymer with water and at the same time removing the lithium chloride formed or acetic acid can be added to replace the lithium atoms with hydrogen atoms. If triorganosilyl ended polymers are desired, $R_3SiCl$ can be added wherein the lithium atoms are replaced by $R_3Si$— groups.

The $R'''_2SiCl_2$ compounds can be illustrated by dimethyldichlorosilane, methylphenyldichlorosilane, methyl-3,3,3-trifluoropropyldichlorosilane, ethylmethyldichlorosilane, diethyldichlorosilane, butylmethyldichlorosilane and the like.

The styrene, alpha-methylstyrene and the organic solvents should be washed, dried and/or distilled prior to use to remove any impurities such as water, inhibitors and the like. Suitable organic solvents include the hydrocarbon solvents which are solvents for the styrene and alpha-methylstyrene, such as cyclohexane, toluene, benzene, n-hexane, mineral spirits, methylcyclohexane, xylene, n-butane, n-heptane, isooctane and cyclopentane.

The organic solvent for the solution of the hexaorganocyclotrisiloxane can be any of those stated above for sue during the polymerization of the styrene and alpha-methylstyrene. The polymerization promoter can be, for example, tetrahydrofuran and bis(2-methoxyethyl)ether.

In the block copolymer of the present invention, R can be methyl, ethyl, phenyl or vinyl. The diorganosiloxane units, therefore, can be illustrated by dimethylsiloxane, diphenylsiloxane, methylphenylsiloxane, diethylsiloxane, ethylmethylsiloxane and methylvinylsiloxane. Preferably, R is methyl.

When A is a triorganosilyl group, $R_3Si$—, triorganochlorosilanes are conveniently use to endblock the block copolymers. Illustrative of these triorganochlorosilanes are trimethylchlorosilane, phenyldimethylchlorosilane, methylphenylvinylchlorosilane, dimethylvinylchlorosilane, dimethylethylchlorosilane and the like.

The block copolymers of the resent invention are thermoplastic. These materials have good physical properties at room temperature in the uncured state, however, upon heating to a temperature such as 80° to 100° C. the material softens as conventional thermoplastic. Therefore, these thermoplastics have similar properties to conventional thermoplastics with added advantages. The thermoplastics can be fabricated in the same manner as ordinary thermoplastics, since they are organic solvent soluble, have softening and melting ranges. These thermoplastics can readily be fabricated and molded at temperatures above 150° C. or at lower temperatures from solutions. Since these thermoplastics do not need to be cured to obtain their excellent properties, they can be put into solution or molded repeatedly without loss of property. These thermoplastics are not considered as gas permeable materials since they have a gas permeability for oxygen of less than 10 ×10$^{-9}$cm$^3$ cm/cm$^2$sec cm Hg. These thermoplastics are film formers and have the advantage of being readily fabricated. The thermoplastics have good electrical properties and good weatherability. These properties provide excellent thermoplastic protective coatings and electrical insulation which can be applied from the polymer melt or solution.

The thermoplastics rapidly lose their physical properties when the polymer mixture contains 5 weight percent or more free polydiorganosiloxane or contains 10 weight percent or more free polystyrene or poly-alpha-methylstyrene. Therefore, the thermoplastics of the present invention must have less than 5 weight percent free polystyrene or poly-alpha-methylstyrene. Free copolymers of styrene and alpha-methylstyrene are also considered within these limitations.

The following examples are illustrative only and should not be construed as limiting the present invention which is properly delineated in the claims.

EXAMPLE 1

A solution of 0.01 moles of dilithiostilbene in 20 ml. of tetrahydrofuran was added to a solution of 100 g. of purified styrene in 400 ml. of pure dry benzene which was cooled with dry ice prior to the addition of the lithium compound in a dry nitrogen atmosphere. After 30 minutes the styrene had polymerized and the dark red solution was allowed to warm to room temperature. To this product, a 100 ml. portion of a dry solution of 100 g. hexamethylcyclotrisiloxane in 740 ml. of purified benzene was added without exposure to the atmosphere. The highly viscous mixture was vigorously stirred for one hour at which time the characteristic red color of the "living" polymer disappeared. The remaining hexamethylcyclotrisiloxane solution was added, together with 50 ml. of purified $(CH_3OCH_2CH_2)_2O$. After 90 minutes polymerization at ambient temperature, the resulting polymer has a formula

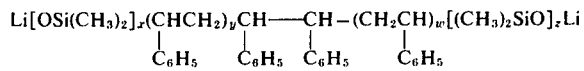

The reaction was terminated by adding 5 ml. of acetic acid and then 100 ml. of a 20 weight percent solution of sodium bicarbonate in water. The solution was washed with water until neutral and then precipitated by adding the solution to 3,000 ml. of ethanol. The precipitate was washed twice with ethanol and then dried at 40° C. at 1 mm Hg for 24 hours. The resulting product was a hydroxyl endblocked block copolymer having a molecular weight as determined by membrane osmometry of 47,600, the sum y and w was about 242 and 52.8 weigh percent was polystyrene blocks and 47.2 weight percent was polydimethylsiloxane blocks. To 20 g. of the above block copolymer in 200 ml. of cyclohexane, 0.2 ml. of stannous octoate was added. The solvent was removed and the product was heated at 140° C. at 1 mm Hg for 24 hours. The product was then cooled, dissolved in 500 ml. of toluene and precipitated by adding it to 2,000 ml. of ethanol. The precipitated block copolymer was washed with ethanol and then dried at 40° C. at 1 mm Hg. for 24 hours. The molecular weight of the resulting block copolymer was 303,000 by membrane osmometry and the formula was

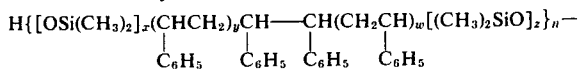

where n was 5.4. No free polydimethylsiloxane was detected in the block copolymer product. The tensile strength at yield of the above block copolymer on compression molded test bars was 2,000 p.s.i. and the elongation at yield was 4.5 percent. The tensile strength at break was 2,300 p.s.i. and the elongation at break was 13 percent. The tear strength, Die B, was greater than 500 p.l.i. The molded test bars were transparent plastics.

EXAMPLE 2

The procedure of Example 1 was used to prepare block copolymers except as defined below. The lithium ended block copolymer as prepared in Example 1 was condensed by adding 3,3,3-trifluoropropylmethyldichlorosilane and allowing the condensation to continue for 18 hours. The solution was then filtered, washed with water and the solvent removed in a vacuum at 80° C. The formula of the condensed block copolymer was

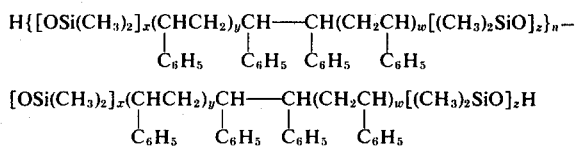

In the first block copolymer, the sum of $y + w$ was about 87, 40 weight percent polystyrene blocks and 60 weight percent polydimethylsiloxane blocks. The value of $n$ was 1.6. The tensile strength at yield was 470 p.s.i. and the elongation at yield was 6 percent. The tensile strength at break was 960 p.s.i. and the elongation at break was 240 percent.

In the second block copolymer the sum of $y + w$ was about 72, 50 weight percent polystyrene blocks and 50 weight percent polydimethylsiloxane blocks. The value of $n$ was 3.8. The tensile strength at yield was 1,280 p.s.i. and the elongation at yield was 8 percent. The tensile strength at break was 1,280 p.s.i. and the elongation at break was 540 percent. The second block copolymer had a dielectric constant at $10^5$ Hertz of 2.63, a dissipation factor at $10^5$ Hertz of 0.00088, a volume resistivity of $1.8 \times 10^{14}$ ohm-cm, and a dielectric strength of 746 volts/mil. compression molded test bars of 35–37 mil. thickness were aged in a commercial dew-cycle weatherometer from which the filters had been removed. The results are shown below for tensile strength and elongation at break.

| Time in Weatherometer, hours | Tensile strength, p.s.i. | %retention of Tensile Strength | Elongation % | %retention of Elongation |
|---|---|---|---|---|
| 0 | 1630 | — | 430 | — |
| 96 | 1406 | 86.3 | 263 | 61.2 |
| 416 | 1423 | 87.3 | 196 | 45.6 |
| 625 | 1395 | 85.6 | 182 | 42.3 |

EXAMPLE 3

The block copolymer as described in Example 1 except the lithium endblocked block copolymer was condensed as described in Example 2 and $n$ had a value of 1.7, had a tensile strength at yield of 1,100 p.s.i. and an elongation of 8 percent, and a tensile strength at break of 2,200 p.s.i. and an elongation of 350 percent. The block copolymer also had a tear strength, Die B, of 490 p.l.i. A mixture of 45 g. of the above block copolymer, 5 g. of polydimethylsiloxane having a number average molecular weight of 22,800 and a $M_w/M_n$ of 1.2 and 200 ml. of toluene was allowed to evaporate and then the remainder of the toluene was removed by vacuum drying. The resulting polymer mixture was compression molded into test bars which had a tensile strength at break of 1,400 p.s.i., and elongation at break of 340 percent and a tear strength, Die B, of 250 p.l.i.

A similar mixture as described above was prepared except 15 weight percent free polystyrene having a number average molecular weight of 21,000 and a $M_w/M_n$ of 1.2, based on the weight of the polymer components. The compression molded test bars had a tensile strength at break of 1,400 p.s.i. and an elongation at break of 100 percent. This illustrates the deleterious effect on the physical properties of either free polydiorganosiloxane or free polystyrene in the thermoplastic That which is claimed is:

1. A thermoplastic consisting essentially of a block copolymer of the formula

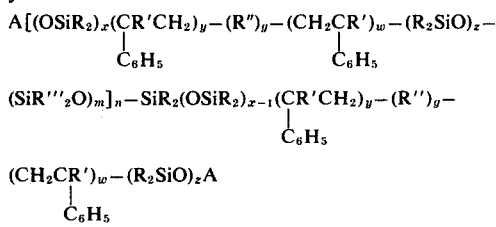

in which each R is a monovalent radical selected from the group consisting of methyl, ethyl, phenyl and vinyl, each R' is selected from the group consisting of a hydrogen atom and a methyl radical, R'' is a divalent hydrocarbon radical having from two to 30 inclusive carbon atoms, each R''' is a monovalent radical selected from the group consisting of methyl, ethyl, propyl, butyl, phenyl and 3,3,3-trifluoropropyl, each A is a monovalent radical selected from the group consisting of a hydrogen atom and $R_3Si$- radicals, $m$ is an integer of from 0 to 1 inclusive, $w$ and $y$ have a value such that the molecular weight of

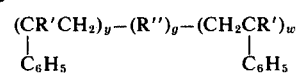

is greater than 7,000 $x$ and $z$ have a value such that the block copolymer has 40 to 60 inclusive weight percent $R_2SiO$, $g$ is an integer of from 0 to 1 inclusive, and $n$ has a value greater than 1, there being present less than 5 weight percent free polydiorganosiloxane and there being present less than 10 weight percent free polystyrene.

2. The thermoplastic in accordance with claim 1 in which R' is a hydrogen atom.
3. The thermoplastic in accordance with claim 1 in which R' is a methyl radical.
4. The thermoplastic in accordance with claim 2 in which R is a methyl radical and A is a hydrogen atom.
5. The thermoplastic in accordance with claim 3 in which R is a methyl radical and A is a hydrogen atom.
6. The thermoplastic in accordance with claim 4 in which $g$ is 1.

* * * * *